(12) United States Patent
Ryu

(10) Patent No.: US 9,871,867 B2
(45) Date of Patent: Jan. 16, 2018

(54) MESSAGE PROCESSING UNIT OF PLC SYSTEM

(71) Applicant: LSIS CO., LTD., Gyeonggi-do (KR)

(72) Inventor: Hwa-Soo Ryu, Chungcheongnam-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 114 days.

(21) Appl. No.: 14/983,302

(22) Filed: Dec. 29, 2015

(65) Prior Publication Data

US 2016/0191629 A1    Jun. 30, 2016

(30) Foreign Application Priority Data

Dec. 31, 2014    (KR) .................. 10-2014-0195772

(51) Int. Cl.
| | |
|---|---|
| *H04L 29/08* | (2006.01) |
| *H04L 12/741* | (2013.01) |
| *H04L 12/761* | (2013.01) |
| *G05B 19/05* | (2006.01) |
| *H04L 12/403* | (2006.01) |

(52) U.S. Cl.
CPC .......... *H04L 67/125* (2013.01); *G05B 19/052* (2013.01); *H04L 12/403* (2013.01); *H04L 45/16* (2013.01); *H04L 45/74* (2013.01); *G05B 2219/1215* (2013.01); *G05B 2219/25218* (2013.01)

(58) Field of Classification Search
CPC .......... G05B 19/052; G05B 2219/1215; G05B 2219/25218; H04L 12/403; H04L 45/16; H04L 45/74; H04L 67/125
See application file for complete search history.

(56) References Cited

U.S. PATENT DOCUMENTS

| | | | |
|---|---|---|---|
| 5,457,689 A | 10/1995 | Marvit et al. | |
| 5,654,531 A | 8/1997 | Farabee | |
| 6,467,065 B1 | 10/2002 | Mendez et al. | |
| 6,681,139 B1 | 1/2004 | Ohashi et al. | |
| 6,687,551 B2 * | 2/2004 | Steindl | H04L 12/40032 700/1 |

(Continued)

FOREIGN PATENT DOCUMENTS

| | | |
|---|---|---|
| DE | 10301776 A1 | 8/2004 |
| EP | 0427502 A2 | 5/1991 |

(Continued)

OTHER PUBLICATIONS

Japanese Office Action dated Aug. 9, 2016 in 3 pages.
Extended European Search Report for Application No. 15200475.0 dated May 20, 2016 in 8 pages.

*Primary Examiner* — Ahmed Elallam

(74) *Attorney, Agent, or Firm* — K&L Gates, LLP

(57) ABSTRACT

Disclosed is a message processing unit provided in a PLC system including a master and a plurality of slaves. The message processing unit is provided to each of the slaves and includes a first filter configured to receive a message transmitted from the master and to determine whether the message is a broadcast message, a second filter configured to receive the message delivered from the first filter and to determine whether the message is a message-to-be-processed, and a processor configured to process the message he delivered from the first filter or the second filter.

8 Claims, 8 Drawing Sheets

(56) References Cited

U.S. PATENT DOCUMENTS

| | | | |
|---|---|---|---|
| 6,708,069 B2 | 3/2004 | Ohashi et al. | |
| 6,957,109 B2 | 10/2005 | Ohashi et al. | |
| 7,852,790 B2 * | 12/2010 | Furuishi | G05B 19/052 370/257 |
| 9,049,097 B2 * | 6/2015 | Nakamura | H04L 12/4035 |
| 2002/0188659 A1 | 12/2002 | Ohashi et al. | |
| 2004/0153174 A1 | 8/2004 | Ohashi et al. | |
| 2005/0192704 A1 * | 9/2005 | Wielebski | B65G 37/02 700/230 |
| 2007/0288674 A1 * | 12/2007 | Ikeno | G05B 19/058 710/110 |
| 2012/0198541 A1 * | 8/2012 | Reeves | H04L 63/0227 726/13 |
| 2015/0039099 A1 * | 2/2015 | Mizutani | G05B 19/05 700/3 |

FOREIGN PATENT DOCUMENTS

| | | |
|---|---|---|
| EP | 0980166 A1 | 2/2000 |
| JP | H09128015 A | 5/1997 |
| JP | 2000029849 A | 1/2000 |
| JP | 2000099127 A | 4/2000 |
| JP | 2001067107 A | 3/2001 |
| JP | 2005229322 A | 8/2005 |
| KR | 20040091925 A | 11/2004 |
| KR | 1020050100204 A | 10/2005 |
| KR | 1020110113495 A | 10/2011 |
| KR | 20130138962 A | 12/2013 |

* cited by examiner

FIG. 2

| 10 | 9 | 8 | 7 | 6 | 5 | 4 | 3 | 2 | 1 | 0 |
|---|---|---|---|---|---|---|---|---|---|---|
| Message Group | | | MAC ID | | | | | Message ID | | |
| 1 | 0 | | Source MAC ID | | | | | 0 | 0 | 0 |
| 1 | 0 | | Destination MAC ID | | | | | 1 | 0 | 0 |
| 1 | 0 | | Destination MAC ID | | | | | 1 | 0 | 1 |
| 1 | 0 | | Destination MAC ID | | | | | 1 | 1 | 0 |
| 1 | 0 | | Destination MAC ID | | | | | 1 | 1 | 1 |

Message Type #1
Message Type #2
Message Type #3
Message Type #4
Message Type #5

FIG. 3

| 10 | 9 | 8 | 7 | 6 | 5 | 4 | 3 | 2 | 1 | 0 |
|---|---|---|---|---|---|---|---|---|---|---|
| Message Group | | | MAC ID | | | | | Message ID | | |

| Filter Enable | 0 | 0 | 1 | 1 | 1 | 1 | 1 | 1 | 1 | 1 | 1 |
|---|---|---|---|---|---|---|---|---|---|---|---|
| Filter Value | 1 | 0 | Don't care | | | | | Don't care | | | |

0: Filter Enable, 1: Don't care

FIG. 6

| 10 | 9 | 8 | 7 | 6 | 5 | 4 | 3 | 2 | 1 | 0 | |
|----|---|---|---|---|---|---|---|---|---|---|---|
| Message Group | | MAC ID | | | | | | Message ID | | | |
| 0 | 0 | 1 | 1 | 1 | 1 | 1 | 1 | 0 | 0 | 0 | 0:Filter Enable, 1:Don't care |
| 1 | 0 | Don't care | | | | | | 0 | 0 | 0 | |
| Filter Enable | | | | | | | | | | | |
| Filter Value | | | | | | | | | | | |

FIG. 7

| 10 | 9 | 8 | 7 | 6 | 5 | 4 | 3 | 2 | 1 | 0 |
|---|---|---|---|---|---|---|---|---|---|---|
| Message Group | | MAC ID | | | | | | Message ID | | |
| 0 | 0 | 0 | 0 | 0 | 0 | 0 | 0 | 0 | 1 | 1 |
| 1 | 0 | MAC ID of Slave | | | | | | 1 | Don't care | |

Filter Enable
Filter Value

0:Filter Enable, 1:Don't care

MESSAGE PROCESSING UNIT OF PLC SYSTEM

CROSS-REFERENCE TO RELATED APPLICATIONS

This application claims the benefit of Korean Patent Application No. 10-2014-0195772 filed on Dec. 31, 2014 in the Korean Intellectual Property Office, the disclosure of which is incorporated herein by reference in its entirety.

BACKGROUND

Technical Field

The present disclosure relates to processing of a message in a PLC system and, more particularly, to a message processing unit of a PLC system for efficiently processing a message through multiple filtering operations.

Description of the Related Art

A programmable logic controller (PLC) is an electronic device used for factory automation and process automation. The PLC is a general-purpose control device that is used by being programmed by a user. A PLC system generally includes a master module for controlling the entire PLC system and slave modules which are configured to perform a predetermined task for devices to which the PLC system is applied and to receive data from the devices and are capable of communicating the master module.

The PLC is required to have modules equipped with various functions to serve various purposes. Among such modules, the importance of a communication module configured to transmit data to a central processing unit (CPU) of the PLC and receive data from the CPU module has been highlighted.

Conventionally, a slave module receives all messages transmitted from a master module and analyzes the received messages. Thereafter, the slave modules discard the received message if the received message is not destined therefor. The slave modules communicate with the master module in this way in conventional cases.

SUMMARY

FIG. 1 is a diagram illustrating configuration of a conventional PLC system, and FIG. 2 is a diagram illustrating the structure of a message transmitted from a master module in the conventional PLC system. FIG. 3 is a diagram illustrating configuration of a filter of a slave module of the conventional PLC system.

As shown in FIG. 1, a PLC system 100 includes multiple modules. One of the modules operates as a master module 110 and the other modules 120-1 to 120-N operate as slave modules.

Each of the slaves 120-1 to 120-N includes a filter 121-1, . . . , 121-N for receiving a message transmitted from the master 110 and a processor 122-1, . . . , 122-N for processing the received message.

As shown in FIG. 2, a message transmitted from the master 110 to the slaves 120-1 to 120-N is configured as an 11-bit message and is broadly divided into three parts.

Herein, Bits 9 and 10 are allocated for configuration of Message Group field, Bits 3 to 8 are allocated for configuration of MAC ID field, and Bits 0 to 2 are allocated for configuration of Message ID field. Herein, values to which the MAC ID field and the Message ID field are set change according to a message type.

Meanwhile, as shown in FIG. 3, the filters 121-1 to 121-N of the slaves 120-1 to 120-N are configured with a Filter Enable field and a Filter Value field, and configured to receive all types of messages transmitted from the master 110. Herein, the bits set to '0' indicate Enable, and the bits set to '1' indicate Disable.

In FIG. 3, the MAC ID field is not set to Filter Enable because the value of the 'Source MAC ID', which is the MAC ID of the master in 'Message Type #1' of FIG. 2, is not known.

In addition, in FIG. 3, the Message ID field is not set to Filter Enable because each bit of the Message ID field in 'Message Type #1' to 'Message Type #5' of FIG. 2 is not fixed to 0 or 1.

FIG. 4 is a flowchart illustrating a procedure in which a slave of a conventional PLC system processes a message.

Hereinafter, description will be given of a method for slaves of the conventional PLC system to process a message, with reference to FIG. 4. The filters 121-1 to 121-N of the slaves 120-1 to 120-N are configured as shown in FIG. 3 (S410). Thereafter, when the filters 121-1 to 121-N receive a message (S420), filtering is performed according to the configuration established in step S410 (S430).

Since the filters 121-1 to 121-N are configured to receive all types of messages transmitted from the master 110, the filters 121-1 to 121-N need to determine whether the received messages are messages to be processed.

Accordingly, the processor 120 of the slaves 120-1 to 120-N reads an ID of a message received through the filters 121-1 to 121-N (S440), and determines whether the read ID is a valid ID (S450). If the ID is determined to be valid (S450-Yes), the processor processes the message (S460). If the ID is not valid (S450-NO), the processor discards the message (S470).

Accordingly, the slaves 120-1 to 120-N need to perform a process of receiving all types of messages transmitted from the master 110 and determining whether the messages are messages for the slaves to process. Accordingly, as the number of slaves increases, the number of messages transmitted from the master increases and thus the number of messages received by each slave also increases.

Thereby, it takes a long time for the slaves to process the received messages, and the slaves need to perform an operation of determining whether a received message is a message for the slaves to process. Accordingly, processing of the messages is inefficiently.

An object of the present disclosure devised to solve the problem with the conventional art is to provide a message processing unit of a PLC system for efficiently processing messages through multiple filtering operations.

According to an aspect of the present disclosure, there is provided a message processing unit provided in a PLC system including a master and a plurality of slaves, the message processing unit being provided to each of the slaves and including a first filter configured to receive a message transmitted from the master and to determine whether the message is a broadcast message, a second filter configured to receive the message delivered from the first filter and to determine whether the message is a message-to-be-processed, and a processor configured to process the message he delivered from the first filter or the second filter.

The first filter delivers the message to the processor when it is determined that the message is the broadcast message, and delivers the message to the second filter when it is determined that the message is not the broadcast message.

The second filter delivers the message to the processor when it is determined that the message is the message-tobe-processed, and discards the message when it is determined that the message is not the message-to-be-processed.

The message is structured to include a Message Group field, a MAC ID field and a Message ID field and is classified into the broadcast message or the message-to-be-processed according to a value set in the Message ID field, the broadcast message being received by all the slaves and the message-to-be-processed being received by a slave set in the MAC ID field.

The first filter includes a pair of Filter Enable field and Filter Value field, the pair having the same structure as the message, wherein the Filter Enable field and the Filter Value field are configured to determine whether the message is the broadcast message.

A field of the Filter Value corresponding to the Message Group field of the message is set to have the same value as the Message Group field of the broadcast message, and a field of the Filter Value corresponding to the Message ID field of the message is set to have the same value as the Message ID field of the broadcast message.

The second filter includes a pair of Filter Enable field and Filter Value field, the pair having the same structure as the message, wherein the Filter Enable field and the Filter Value field are configured to determine whether the message is the message-to-be-processed.

A field of the Filter Value corresponding to the Message Group field of the message has the same value as the Message Group field of the message-to-be-processed, and a MAC ID of the slave is set as a value of a field of the Filter Value corresponding to the MAC ID field of the message.

According to embodiments of the present disclosure, slaves in a PLC system receive a message transmitted from a master in the PLC system through multiple filtering operations. Accordingly, the slaves receive only messages destined therefor.

Thereby, even if the number of slaves increases, the number of messages processed by one slave remains constant. Therefore, load of message processing interrupt may be reduced, and the time taken to process messages may be reduced. Thereby, messages may be efficiently processed.

BRIEF DESCRIPTION OF THE DRAWINGS

The above and other aspects, features and other advantages of the present disclosure will be more clearly understood from the following detailed description taken in conjunction with the accompanying drawings, in which:

FIG. 2 is a diagram illustrating the structure of a message transmitted from a master module in the conventional PLC system;

FIG. 3 is a diagram illustrating configuration of a future of a slave module of the conventional PLC system;

FIG. 6 is a diagram illustrating configuration of a first filter according to an embodiment of the present disclosure;

FIG. 7 is a diagram illustrating configuration of a second filter according to an embodiment of the present disclosure.

DETAILED DESCRIPTION

Advantages and features of the present disclosure and methods to achieve them will become apparent from the descriptions of exemplary embodiments herein below with reference to the accompanying drawings. However, the present disclosure is not limited to the exemplary embodiments disclosed herein but may be implemented in various different forms. The exemplary embodiments are provided to make the description of the present disclosure thorough and to fully convey the scope of the present disclosure to those skilled in the art. It is to be noted that the scope of the present disclosure is defined only by the claims. Wherever possible, the same reference numbers will be used throughout the descriptions to refer to the same or like parts.

In describing embodiments of the present disclosure, a detailed description of well-known functions and constituents will be omitted if it is determined that such description can unnecessarily obscure the main points of the disclosure. In addition, terms which will be used below are defined in consideration of the functions of the corresponding elements in the disclosure. The definitions of the terms may vary depending on intention of a user, a precedent case, or the like. Therefore, the terms should be defined based on the entire specification.

Hereinafter, a detailed description will be given of configuration and operation of a message processing unit of a PLC system according to embodiments of the present disclosure with reference to the accompanying drawings.

Figure 1:
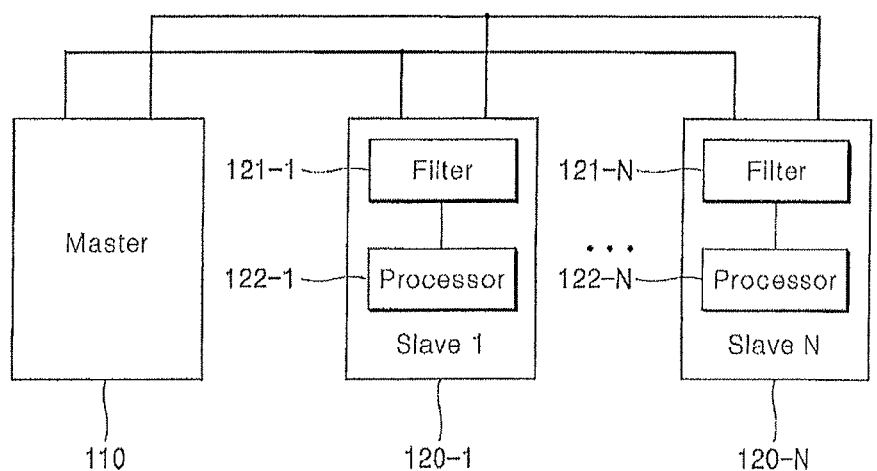
FIG. 1 is a diagram illustrating configuration of a conventional PLC system.
Figure 4:
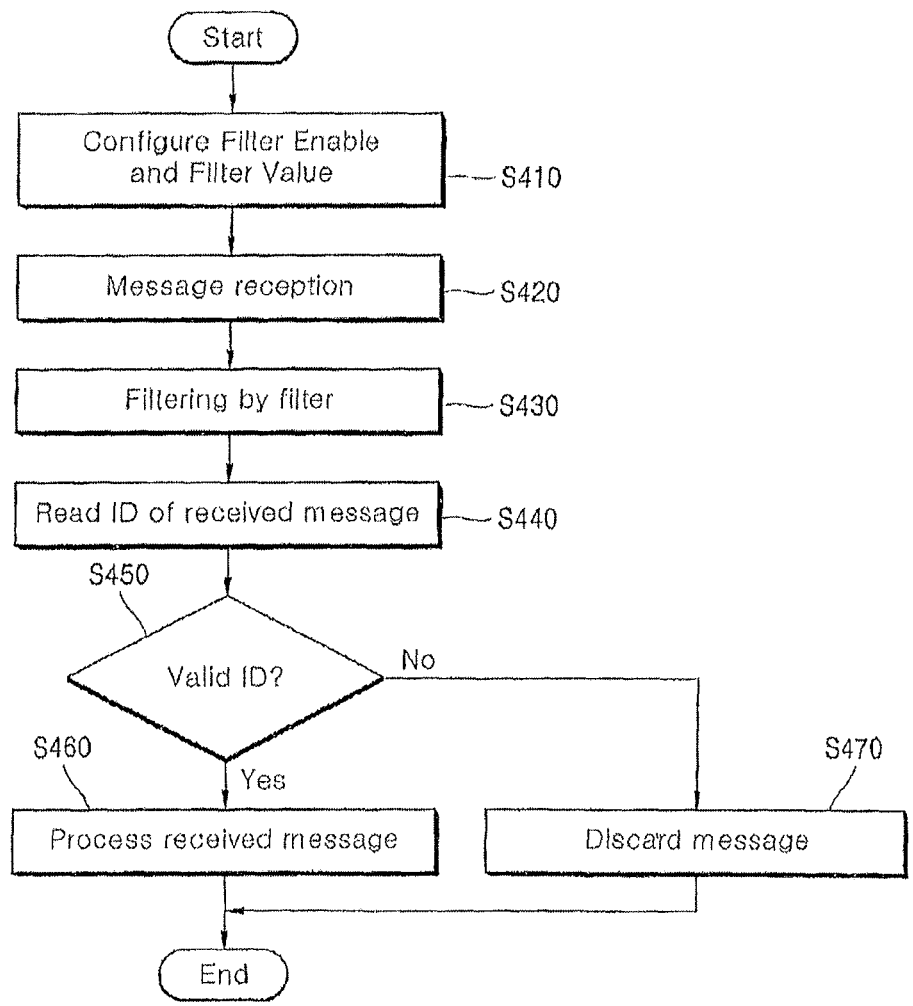
FIG. 4 is a flowchart illustrating the process of processing a message in a slave of the conventional PLC system.
Figure 5:
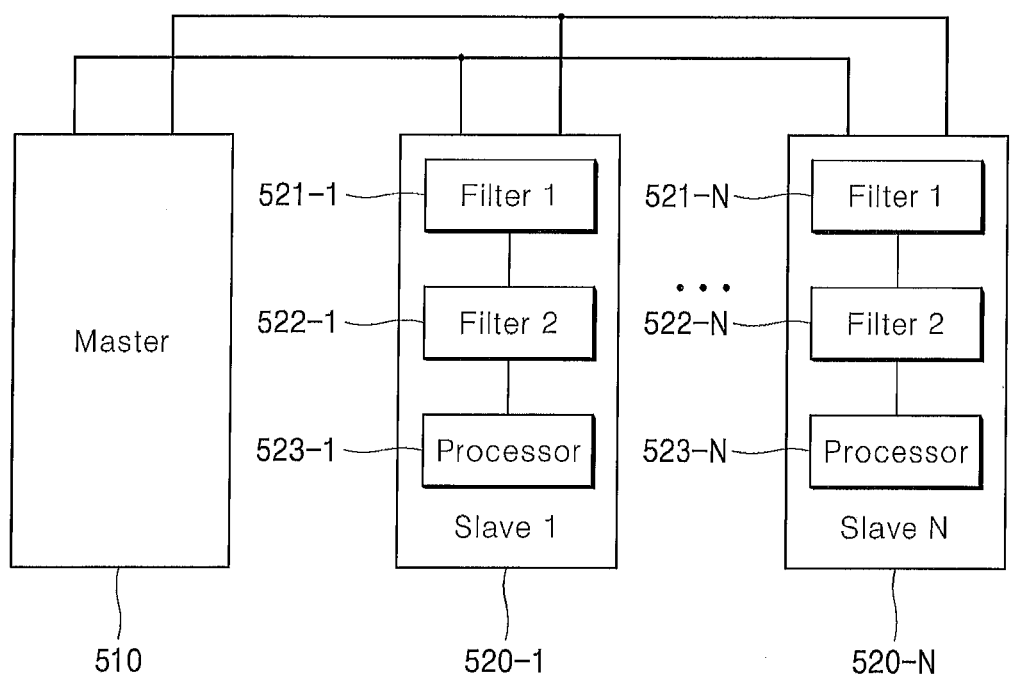
FIG. 5 is a block diagram illustrating a PLC system including a message processing unit according to an embodiment of the present disclosure.

FIG. 5 is a block diagram illustrating a PLC system including a message processing unit according to an embodiment of the present disclosure, and FIG. 6 is a diagram illustrating configuration of a first filter according to an embodiment of the present disclosure. FIG. 7 is a diagram illustrating configuration of a second filter according to an embodiment of the present disclosure.

Referring to FIG. 5, a PLC system 500 including a message processing unit according to an embodiment of the present disclosure includes multiple modules. One of the modules operates as a master module 510 and the other modules 520-1 to 520-N operate as slave modules. Herein, the master 510 transmits five types of the messages shown in FIG. 2 to the slaves 520-1 to 520-N.

Each of the slaves 520-1 to 520-N includes a message processing unit. The message processing unit includes a first filter 521-1, . . . , 521-N, a second filter 522-1, . . . , 522-N and a processor 523-1, . . . , 523-N.

In the slaves 520-1 to 520-N, the first filters 521-1 to 521-N have the same function, the second filters 522-1 to 522-N have the same function and the processors 523-1 to 523-N have the same function. Thus, description will be given of the first slave 520-1 alone.

The first slave 520-1 includes a first filter 521-1, a second filter 522-1 and a processor 523-1.

The first filter 521-1 determines whether a message transmitted from the master 510 is a broadcast message. Herein, the broadcast message represents a message which the master 510 transmits to all slaves.

If the received message is determined to be a broadcast message as a result of determination of the first filter 521-1, the first filter 521-1 delivers the received message to the processor 523-1.

On the other hand, if the received message is not a broadcast message as a result of determination of the first filter 521-1, the first filter 521-1 delivers the received message to the second filter 522-1.

Regarding configuration of the first filter 521-1, 2 bits of Filter Enable corresponding to Message Group field of the message are all set to '0', and bits of Filter Value corresponding to Message Group field of the message are set to '1' and '0', as shown in FIG. 6.

In addition, 3 bits of Filter Enable corresponding to Message ID field of the message are all set to '0', and bits of Filter Value corresponding to Message ID field of the message are all set to '0'.

In addition, 6 bits corresponding to MAC ID field of the message are all set to '1', and thus the first filter 521-1 is not affected by the value of MAC ID field of the message. Specifically, the first filter 521-1 may recognize a message having Message Group field set to '10' and Message ID field set to '000'.

Thereby, a field of Filter Value corresponding to the Message Group field of the message has the same value as the Message Group field of the broadcast message. A field of Filter Value corresponding to the Message ID field of the message set to have the same value as the Message ID field of the broadcast message.

Accordingly, if the first filter 521-1 is configured as shown in FIG. 6, the first filter 521-1 serves to filter the broadcast message because the configuration means that the first filter 521-1 is configured to receive a message of Message Type #1 of FIG. 2.

The second filter 522-1 receives a message delivered from the first filter 521-1 and determines whether the received message is a message to be processed by the slave 520-1 ('message-to-be-processed').

Since the message of Message Type #1 of FIG. 2 is filtered and delivered to the processor 523-1 by the first filter 521-1, the second filter 522-1 receives messages of Message Types #2 to #5 of FIG. 2 from the first filter 521-1.

Meanwhile, if the received message is determined to be a message-to-be-processed as a result of determination of the second filter 522-1, the second filter 522-1 delivers the received message to the processor 523-1.

On the other hand, if it is determined that the received message is not a message-to-be-processed as a result of determination of the second filter 522-1, the second filter 522-1 discards the received message.

Regarding configuration of the second filter 522-1, 2 bits of Filter Enable corresponding to Message Group field of the message are all set to '0' as shown in FIG. 7. Three bits of Filter Enable corresponding to Message ID field of the message are set to '011'.

In addition, 6 bits corresponding to MAC ID field of the message are all set to '0', and 'MAC ID of the slave' is set in Filter Value. That is, the second filter 522-1 may determine whether the message is a message having MAC ID of the slave.

Thereby, a field in Filter Value corresponding to the Message Group field of the message has the same value as the Message Group field of the message-to-be-processed. The value of a field in Filter Value corresponding to the MAC ID field of the message is set to MAC ID of the slave.

Accordingly, if the second filter 522-1 is configured as shown in FIG. 7, the second filter 522-1 receives messages of Message Types #2 to #5 of FIG. 2 and filters the message-to-be-processed of the slave 520-1.

The processor 533-1 processes a message delivered from the first filter 531-1 and a message delivered from the second filter 522-1.

Since the messages which the processor 523-1 receives are all messages-to-be-processed, the processor 523-1 processes both received messages without determining whether the received messages are messages-to-be-processed.

Accordingly, even if the number of slaves increases, the number of messages processed by the processor 523-1 remains constant because messages are delivered to the processor 533-1 through the first and second filters 521-1 and 522-1 are messages-to-be-processed.

According to another embodiment of the present disclosure, a PLC system including a message processing unit includes multiple modules. One of the modules operates as a master module and the other modules operate as slave modules. Herein, the master transmits the five types of messages shown in FIG. 2 to the slaves.

Each of the slaves may include the message processing unit. The message processing unit may include a first filter and a processor.

The first filter may receive a message transmitted from the master and determine whether the received message is a broadcast message. In addition, the first filter may determine whether the message is a message-to-be-processed. The processor may receive the message from the first filter and process the same.

If the first filter determines that the message is a broadcast message, the first filter delivers the message to the processor. If the first filter determines that the message is not a broadcast message, the first filter may determine whether the message is a message-to-be-processed.

If the first filter determines that the message is a message-to-be-processed, the first filter may deliver the message to the processor. If the first filter determines that the message is not a message-to-be-processed, the first filter may discard the message.

In the description above, configuration and functions of a message processing unit of a PLC system according to embodiments of the present disclosure have been discussed. Hereinafter, description will be given of a method for processing a message in a PLC system configured as illustrated in FIG. 5, with reference to the accompanying drawings.

Figure 8:
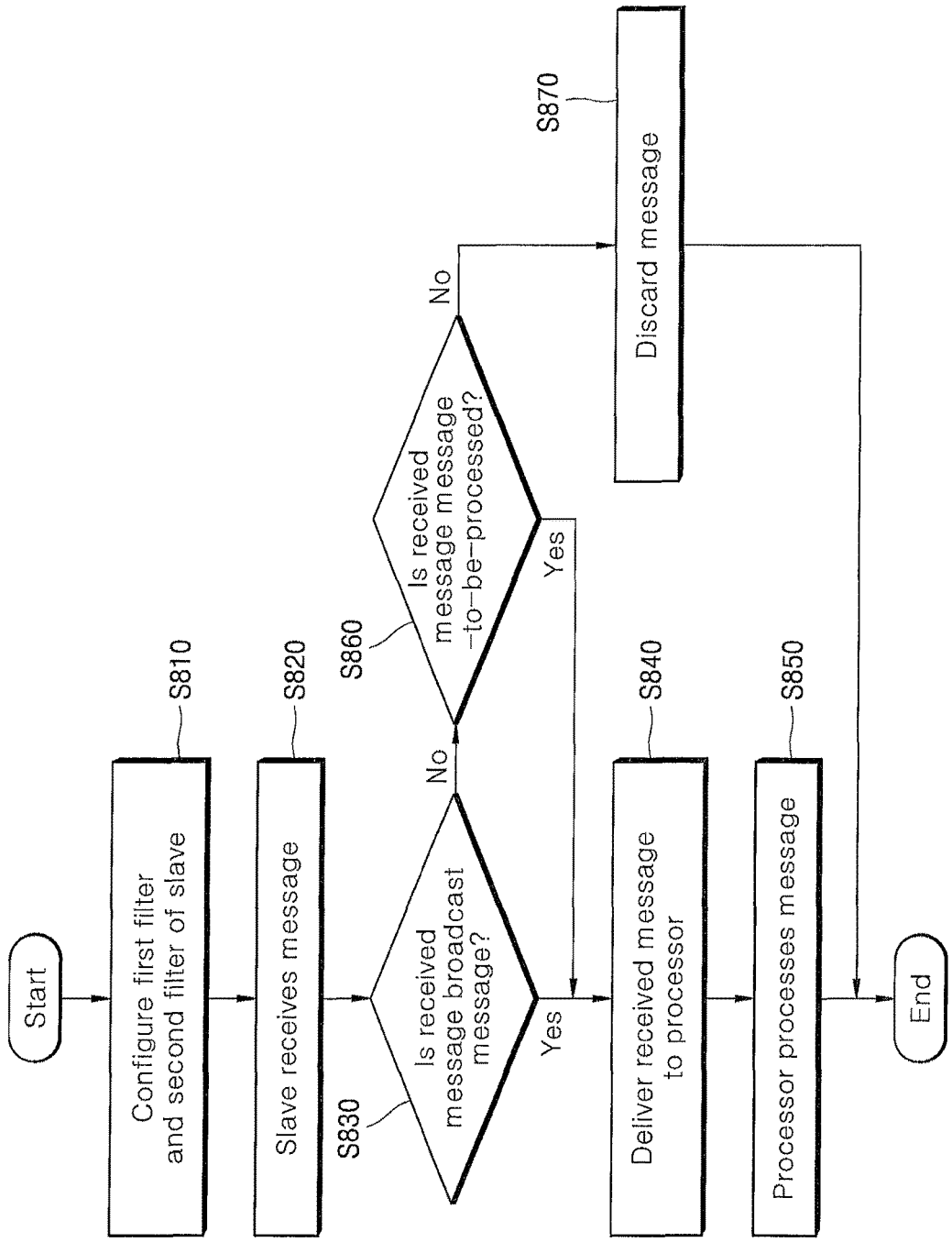
FIG. 8 is a flowchart illustrating operation of processing a message in a message processing unit of a PLC system according to an embodiment of the present disclosure.

FIG. 8 is a flowchart illustrating operation of processing a message in a message processing unit of a PLC system according to an embodiment of the present disclosure. Hereinafter, description will be given focusing on operation of one slave. The description can be applied to all slaves configuring the PLC system.

Referring to FIG. 8, the first and second filters of the slave 520-1 of the PLC system 500 are configured as shown in FIGS. 6 and 7 (S810).

Thereby, the first filter 521-1 of the slave 520-1 is configured to determine whether a message transmitted from the master 510 is a broadcast message. The second filter 522-1 of the slave 520-1 is configured to determine whether the message transmitted from the master 510 is a message-to-be-processed which the slave equipped with the second filter 522-1 should process.

If the slave 520-1 receives a message from the master 510 of the PLC system (S820) after the first and second filters 521-1 and 522-1 of the slave 520-1 are configured in step S810, the first filter 521-1 of the slave 520-1 determines whether the received message is a broadcast message (S830).

If the received message is determined to be a broadcast message (S830—Yes) as a result of determination in step S830, the first filter 521-1 delivers the message to the processor 523-1 (S840).

Thereafter, the processor 523-1 receives and processes the message delivered from the first filter 521-1 in step S840 (S850).

If the received message is determined to be a broadcast message (S830—No) as a result of determination in step S830, the first filter 521-1 delivers the message to the second filter 522-1, and the second filter 522-1 determines whether the received message is a message-to-be-processed (S860).

If the received message is determined to be a message-to-be-processed (S860—Yes) as a result of determination in step S860, the second filter 522-1 delivers the message to the processor 523-1 (S840), and the processor 523-1 processes the message delivered from the second filter 522-1 (S850).

On the other hand, if it is determined that the received message is not a message-to-be-processed (S860—No) as a result of determination in step S860, the second filter 522-1 discards the message (S870).

According to embodiments of the present disclosure described above, the slave in the PLC system receives a message transmitted from the master in the PLC system through multiple filtering operations. Accordingly, the slave receives only messages destined therefor.

Thereby, even if the number of slaves increases, the number of messages processed by one slave remains constant. Therefore, load of message processing interrupt may be reduced, and the time taken to process messages may be reduced. Thereby, messages may be efficiently processed.

Embodiments of configuration and functions of a message processing unit of a PLC system have been described. However, the scope of the present disclosure is not limited thereto. Various substitutions, modifications and changes can be made in the present disclosure within the scope which is apparent to those skilled in the art.

Accordingly, the exemplary embodiments described herein and the accompanying drawings are not intended to limit the scope of the present disclosure. The technical idea of the present disclosure is not limited by the exemplary embodiments and the accompanying drawings. The scope of protection sought by the present disclosure should be determined by the appended claims and their legal equivalents, and all changes coming within the meaning and equivalency range of the appended claims are intended to be embraced therein.

What is claimed is:

1. A message processing unit provided in a Programmable Logic Controller (PLC) system comprising a master and a plurality of slaves, the message processing unit being provided to each of the slaves, the message processing unit comprising:
   a first filter configured to receive a message transmitted from the master and configured to determine whether the message is a broadcast message;
   a second filter configured to receive the message from the first filter when it is determined that the message is not a broadcast message, and configured to determine whether the message is a message-to-be-processed; and
   a processor configured to process the message from the first filter when it is determined that the message is a broadcast message or from the second filter when it is determined that message is a message-to-be-processed.

2. The message processing unit according to claim 1, wherein the first filter is configured to deliver the message to the processor when it is determined that the message is the broadcast message, and is further configured to deliver the message to the second filter when it is determined that the message is not the broadcast message.

3. The message processing unit according to claim 1, wherein the second filter is configured to deliver the message to the processor when it is determined that the message is the message-to-be-processed, and is further configured to discard the message when it is determined that the message is not the message-to-be-processed.

4. The message processing unit according to claim 1, wherein the message comprises a Message Group field, a MAC ID field and a Message ID field, wherein the message processing unit is classified into the broadcast message or the message-to-be-processed according to a value set in the Message ID field, the broadcast message being received by all the slaves and the message-to-be-processed being received by a slave set in the MAC ID field.

5. The message processing unit according to claim 4, wherein the first filter comprises a pair of Filter Enable field and Filter Value field, the pair having the same structure as the message,
   wherein the Filter Enable field and the Filter Value field are configured to determine whether the message is the broadcast message.

6. The message processing unit according to claim 5, wherein a field of the Filter Value corresponding to the Message Group field of the message is set to have the same value as the Message Group field of the broadcast message, and a field of the Filter Value corresponding to the Message ID field of the message is set to have the same value as the Message ID field of the broadcast message.

7. The message processing unit according to claim 4, wherein the second filter comprises a pair of Filter Enable field and Filter Value field, the pair having the same structure as the message,
   wherein the Filter Enable field and the Filter Value field are configured to determine whether the message is the message-to-be-processed.

8. The message processing unit according to claim 7, wherein a field of the Filter Value corresponding to the Message Group field of the message has the same value as the Message Group field of the message-to-be-processed, and a MAC ID of the slave is set as a value of a field of the Filter Value corresponding to the MAC ID field of the message.

* * * * *